United States Patent
Keskin (10) Patent No.: US 12,510,945 B2
(45) Date of Patent: Dec. 30, 2025

(54) RECOVERY CIRCUIT FOR POWER FAILURE ON AUTOMOTIVE POWER MANAGEMENT INTEGRATED CIRCUIT (PMIC) DEVICES

(71) Applicant: QUALCOMM Incorporated, San Diego, CA (US)

(72) Inventor: Mustafa Keskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 18/184,577

(22) Filed: Mar. 15, 2023

(65) Prior Publication Data
US 2024/0310888 A1    Sep. 19, 2024

(51) Int. Cl.
G06F 1/26      (2006.01)
G06F 1/28      (2006.01)
G06F 1/30      (2006.01)
G06F 1/3287    (2019.01)

(52) U.S. Cl.
CPC ............. *G06F 1/263* (2013.01); *G06F 1/28* (2013.01); *G06F 1/30* (2013.01); *G06F 1/3287* (2013.01)

(58) Field of Classification Search
None
See application file for complete search history.

(56) References Cited

U.S. PATENT DOCUMENTS

| | | | |
|---|---|---|---|
| 5,654,859 A | 8/1997 | Shi | |
| 6,597,073 B1 | 7/2003 | Check | |
| 9,098,276 B2 * | 8/2015 | Humphrey | H02J 1/10 |
| 10,684,671 B2 | 6/2020 | Sridhar et al. | |
| 2009/0193278 A1 | 7/2009 | Camilleri et al. | |
| 2016/0064986 A1 * | 3/2016 | Langlinais | H02J 7/0068 320/134 |
| 2019/0296644 A1 * | 9/2019 | Huang | G06F 1/26 |
| 2019/0372376 A1 * | 12/2019 | Kwak | H01R 31/065 |
| 2021/0034138 A1 * | 2/2021 | Jeon | G06F 1/3287 |
| 2022/0334628 A1 * | 10/2022 | Lee | G06F 1/26 |
| 2023/0065469 A1 * | 3/2023 | Zou | G06F 1/3243 |
| 2023/0185351 A1 * | 6/2023 | Shallal | G06F 1/263 713/300 |
| 2024/0012515 A1 * | 1/2024 | Moreno Galbis | G06F 3/0418 |
| 2024/0036626 A1 * | 2/2024 | Nam | G06F 1/3203 |

OTHER PUBLICATIONS

International Search Report and Written Opinion—PCT/US2024/013985—ISA/EPO—Jun. 12, 2024.

* cited by examiner

*Primary Examiner* — Danny Chan
(74) *Attorney, Agent, or Firm* — Seyfarth Shaw LLP (57) ABSTRACT

A method for recovering from a power failure includes detecting a power collapse at a first voltage regulator supplying a first subsystem. The method also includes coupling a supply voltage rail or a voltage supply node of the first subsystem to a second voltage source, in response to detecting the power collapse at the first voltage regulator. The method further includes receiving power, at the first subsystem, from the second voltage source in response to the coupling of the first subsystem to the second voltage source.

18 Claims, 11 Drawing Sheets

RECOVERY CIRCUIT FOR POWER FAILURE ON AUTOMOTIVE POWER MANAGEMENT INTEGRATED CIRCUIT (PMIC) DEVICES

BACKGROUND

Field

Aspects of the present disclosure relate to power management, and more specifically to a supplementary recovery circuit for power failure on automotive power management integrated circuit (PMIC) devices.

Background

Automobiles are increasingly incorporating integrated circuits (ICs). Some of these ICs include power management ICs (PMICs) that supply power to various systems of the automobile. An unexpected power collapse at a PMIC may cause power loss of a critical system of the automobile, creating safety issues. A possible solution is increasing a number of PMICs. Such a solution is costly, however. There is a need for a cost-effective, real-time, efficient way of supporting supply voltage outages of automotive ICs.

SUMMARY

In aspects of the present disclosure, a method for recovering from a power failure includes detecting a power collapse at a first voltage regulator supplying a first subsystem. The method also includes coupling a supply voltage rail or a voltage supply node of the first subsystem to a second voltage source, in response to detecting the power collapse at the first voltage regulator. The method further includes receiving power, at the first subsystem, from the second voltage source in response to the coupling of the first subsystem to the second voltage source.

In other aspects of the present disclosure, a power management integrated circuit (PMIC) includes a first voltage regulator coupled to a first subsystem. The PMIC also includes a second power supply selectively coupled to the first subsystem via a first switch.

Other aspects of the present disclosure are directed to an apparatus for recovering from a power failure. The apparatus includes means for detecting a power collapse at a first voltage regulator supplying a first subsystem. The apparatus also includes means for coupling the first subsystem to a second voltage source, in response to detecting the power collapse at the first voltage regulator in order to provide power to the first subsystem from the second voltage source.

In other aspects of the present disclosure, a system on chip (SoC) circuit includes a first voltage regulator coupled to a first subsystem. The SoC also includes a second power supply selectively coupled to the first subsystem via a first switch.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

In any device, power collapse is a serious failure. Computing devices, such as a central processing unit (CPU) or a graphics processing unit (GPU), rely on a supply voltage from a voltage regulator on a power management integrated circuit (PMIC). Upon occurrence of a power collapse, power management IC devices may report to the system a no-power alarm or a no-boot alarm. These alarms may generate an interrupt to the system or to software, most likely triggering a system shut down.

Automobiles are increasingly incorporating integrated circuits (ICs). Some of these ICs include PMICs that supply power to various systems of the automobile. An unexpected power collapse at a PMIC may cause power loss of a critical system of the automobile, creating safety issues.

PMICs include voltage regulators that supply power to a subsystem or component within a chipset, such as a system-on-a-chip (SoC). For example, a switching regulator may supply a CPU at an SoC. If power collapses at one of the voltage regulators, the subsystem or component supplied by the failed voltage regulator may also fail. According to aspects of the present disclosure, a supplemental recovery circuit enables recovery from a power failure at a voltage regulator of a power management IC. The supplemental recovery circuit includes switches between voltage regulators. The switches may be included in the PMIC or in the chipset. When a power collapse is detected at a voltage regulator, a switch is turned on/closed, allowing power for the chipset with collapsed power to be supplied from another supplementary voltage regulator. In some aspects, multiple switches are turned on/closed. Bidirectional electrostatic discharge (ESD) devices may be provided for ESD protection and voltage reduction, in case the regulators are in different voltage domains. The supplementary regulator may provide quiescent power to enable safe operation of the subsystem with collapsed power for a predefined configurable time interval until the automobile arrives in a safe location or a safe mode is entered.

Particular aspects of the subject matter described in this disclosure can be implemented to realize one or more of the following potential advantages. In some examples, the described techniques, such as supplementing power from an automotive voltage regulator experiencing a power collapse, improves automobile safety without incurring significant overhead.

Figure 1:
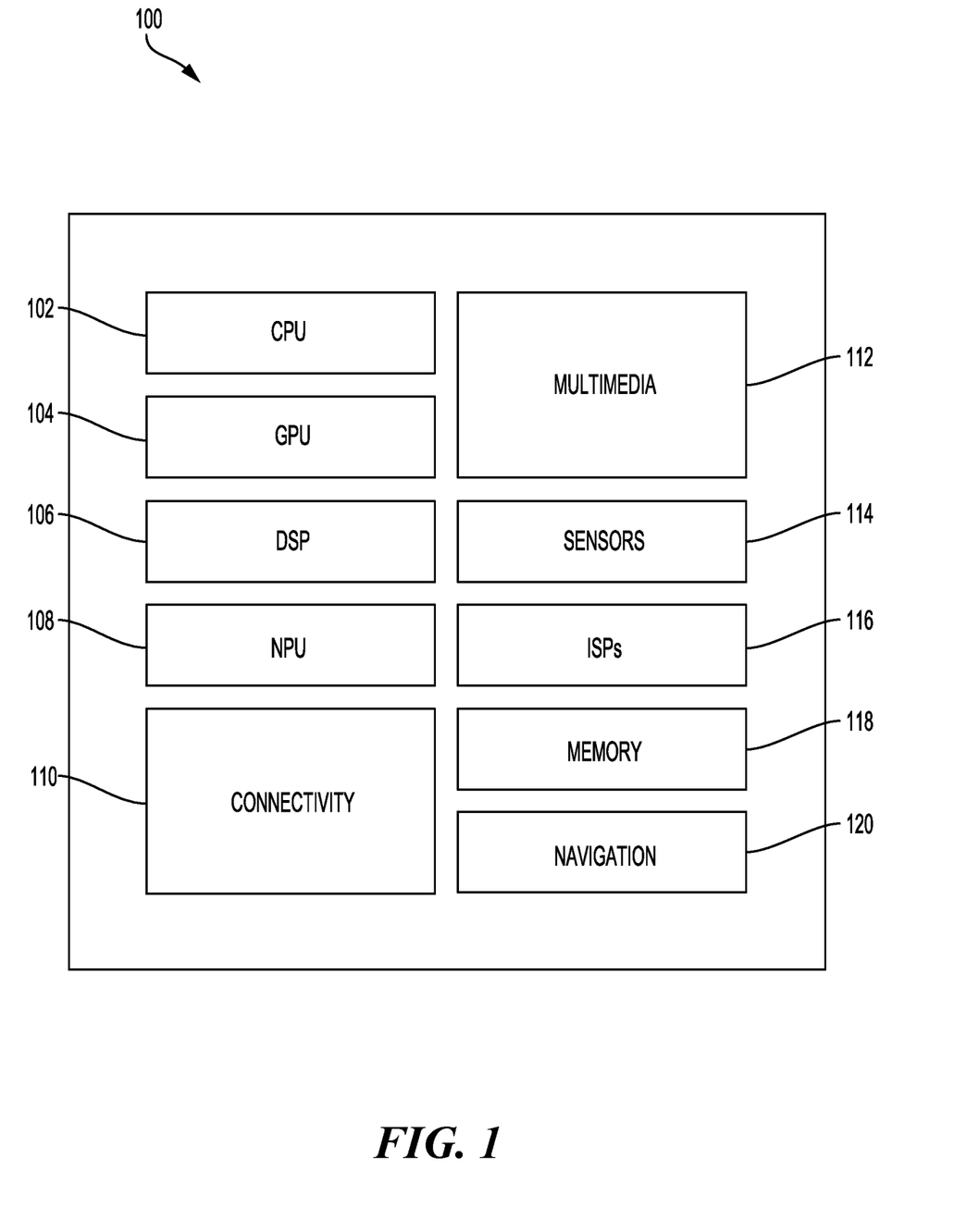
FIG. 1 illustrates an example implementation of a host system-on-a-chip (SoC), including a power limits driver, in accordance with certain aspects of the present disclosure.

FIG. 1 illustrates an example implementation of a host system-on-a-chip (SoC) 100, which includes a supplementary recovery circuit for power management integrated circuit (PMIC) power failure, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, USB connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set. The host SoC 100 may be deployed in an automobile along with PMICs supporting the SoC 100.

In any device, a power collapse is a serious failure. Computing devices, such as a central processing unit (CPU), a neural processing unit (NPU), a graphics processing unit (GPU), and automotive components, such as driver assistance systems, rely on a supply voltage from a voltage regulator on a power management integrated circuit (PMIC). Sensors are provided to inform the CPU about power supply. Real time monitoring using regulator output voltage or current monitors, temperature monitors, watchdog timers, frequency monitors, etc., may help detect a power collapse. Upon occurrence of a power collapse, power management IC devices may report to the system a no-power alarm or a no-boot alarm. A no-boot alarm may occur during a boot up sequence if no power is detected. These alarms may generate an interrupt to the system or to software, most likely triggering a system shut down.

Due to unknown conditions, accidents, or device failures, unexpected loss of power at any regulator output supply voltage of a power management IC may be disastrous. To improve safety, automotive ICs require extensive testing or safety features. Error correction and triple modular redundancy (e.g., performing a computation three times) may be specified. Built-in self-tests (BISTs) for power on are employed during mission mode and also during boot up, as well as other safety check tests, such as an analog BIST (ABIST), a logic BIST (LBIST), a system BIST (SBIST), and a parametric BIST (PBIST).

A possible solution to preventing a power collapse is doubling a number of power management ICs. Such a solution is costly, however, because doubling a chipset may require doubling some parts of a printed circuit board (PCB) and components associated with the extra chipset. In addition, doubling the PMICs may require an extra controller and system changes that may be difficult to manage.

There is a demand for a cost-effective, real-time, efficient way of supporting supply voltage outages of any of automotive ICs.

Figure 2:
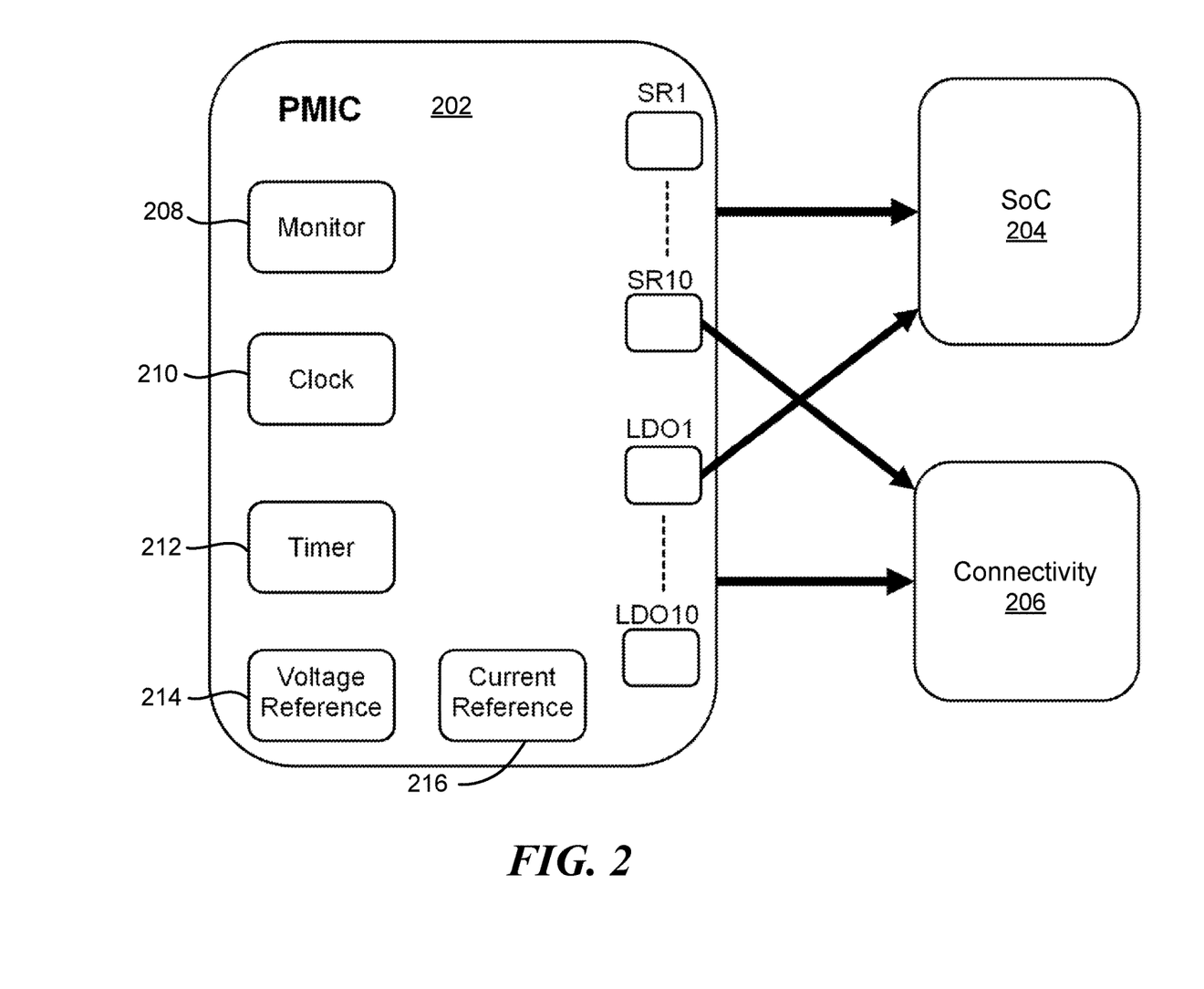
FIG. 2 is a block diagram illustrating voltage regulators in a power management integrated circuit (PMIC) supporting multiple chipsets, in accordance with aspects of the present disclosure.

FIG. 2 is a block diagram illustrating voltage regulators in a power management integrated circuit (PMIC) supporting multiple chipsets, in accordance with aspects of the present disclosure. A PMIC 202 includes voltage regulators. In the example of FIG. 2, the voltage regulators include ten switching regulators (SR1 to SR10) and ten low dropout (LDO) regulators (LDO1 to LDO 10), although any number of voltage regulators may be included to support different systems (also referred to as chipsets or devices), such as an SoC 204 and a connectivity module 206. The SoC 204 and connectivity module 206 may operate in different voltage domains or the same voltage domain. The SoC 204 may be an example of the SoC 100 described with reference to FIG. 1. Sensors, such as monitors 208, clock circuits 210, timer circuits 212, a bandgap voltage reference 214, and a bandgap current reference 216 are also shown as part of the PMIC 202. In case the PMIC is part of a system on chip (SoC) circuit, the PMIC may be an on-chip PMIC, an auxiliary PMIC, or an on-chip SoC.

Each voltage regulator (SR1 to SR10 and LDO1 to LDO 10) supplies power to a subsystem or component within either the SoC 204 or connectivity module 206. For example, a first switching regulator SR1 may supply a CPU (not shown) at the SoC 204 and a first LDO regulator LDO1 may supply a GPU (not shown) at the SoC 204. Similarly, a second switching regulator SR2 may supply a first subsystem or component (not shown) at the connectivity module 206 and a second LDO regulator LDO2 may supply another subsystem or component (not shown) at the connectivity module 206. If power collapses at one of the voltage regulators (SR1 to SR10 and LDO1 to LDO 10), the subsystem or component supplied by the failed voltage regulator (SR1 to SR10 and LDO1 to LDO 10) may also fail.

Figure 3:
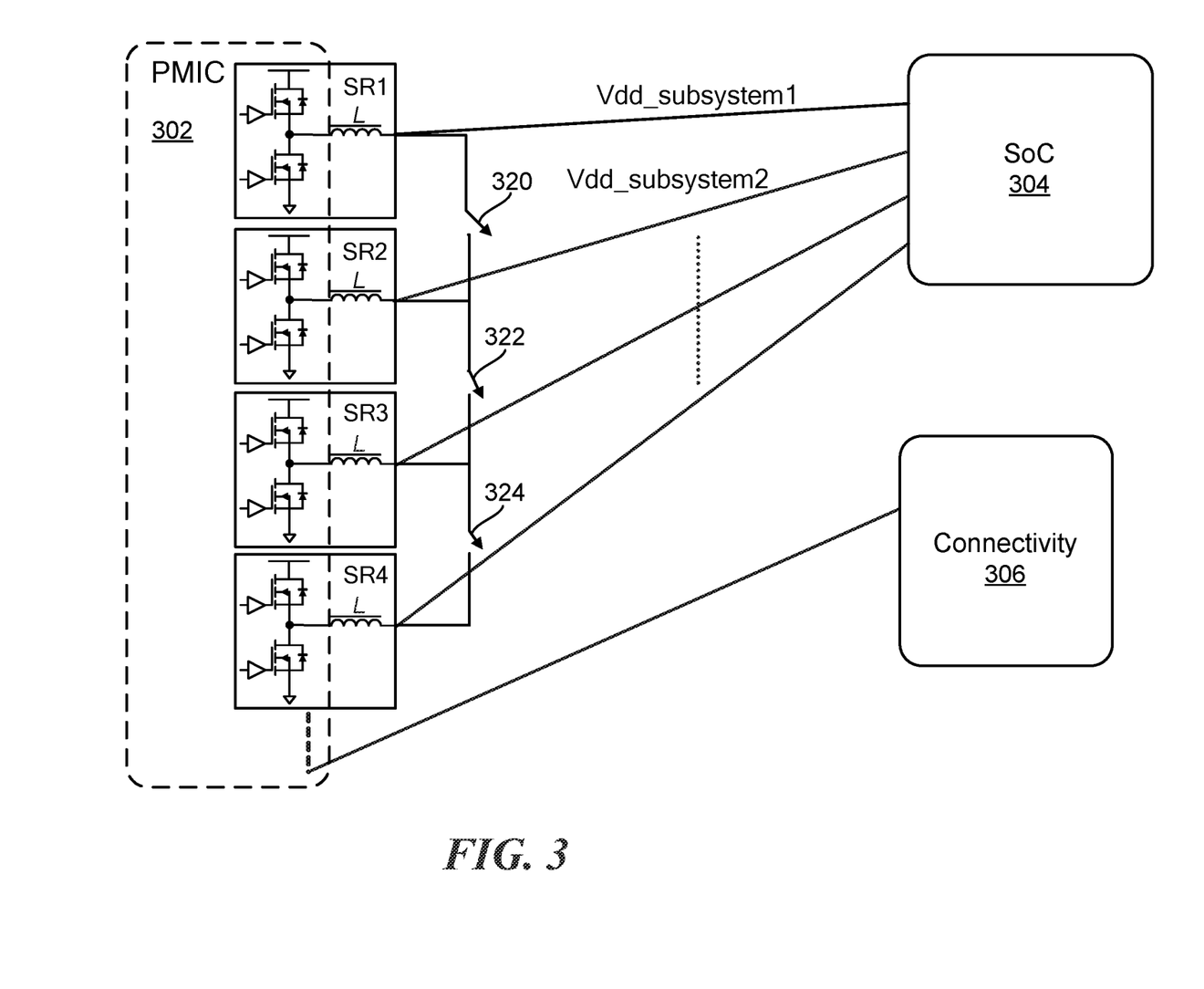
FIG. 3 is a diagram illustrating a supplemental recovery circuit, in accordance with aspects of the present disclosure.

According to aspects of the present disclosure, a supplemental recovery circuit enables recovery from a power failure at a voltage regulator of a power management IC. FIG. 3 is a diagram illustrating a supplemental recovery circuit, in accordance with aspects of the present disclosure. In the example of FIG. 3, a PMIC 302 supplies power to an SoC 304 and a connectivity module 306. Although FIG. 3 shows four switching regulators (SR1 to SR4), any number of switching regulators and/or LDO type regulators are contemplated. A first switching regulator SR1 supplies voltage Vdd_subsystem1 to a first component or subsystem of the SoC 304. A second switching regulator SR2 supplies voltage Vdd_subsystem2 to a second component or subsystem of the SoC 304. At least one other voltage regulator (not shown) supplies voltage to the connectivity module 306.

According to aspects of the present disclosure, switches 320, 322, 324 are provided in series between the voltage regulators SR1, SR2, SR3, SR4. The switches 320, 322, 324 may be included in the PMIC 302 or in the chipset (e.g., SoC 304 or connectivity module 306). In FIG. 3, however, the switches 320, 322, 324 are located on the printed circuit board, but not the PMIC 302, to receive filtered voltage from an inductor L from each regulator SR1, SR2, SR3, SR4. In some aspects, the switches 320, 322, 324 are shunt switches.

When a power collapse is detected, a closest switch to a neighbor voltage regulator is turned on. For example, if the power collapses at the first switching regulator SR1, a first switch 320 closes. As a result, voltage from the second switching regulator SR2 supplies the subsystem coupled to the first switching regulator SR1. The second switching regulator SR2 acts as a supplementary regulator. If needed, two switches from up and down switching regulators may be turned on at the same time in case one switching regulator is not able to provide power to two loads at the same time. Hence, two operational switching regulators may provide power to the three loads when one of the switching regulators failed. For example, a second switch 322 may close in addition to the first switch 320 to enable voltage from the third switching regulator SR3 (in addition to voltage from the second switching regulator SR2) to be received at the subsystem coupled to the first switching regulator SR1. Switches can be on-chip or off chip. On-Chip may reduce the cost and also integrates switches on the chip. Off-chip may be advantageous if the chip becomes damaged, possibly affecting switches on the chip. If the switch is implemented on-chip, the switch may be placed close to the chip boundary or be placed inside the feedback or sense circuit that controls the operation of the voltage regulator. Switches may also be provided on switching nodes. This location may be desirable because inductors of failing switching regulators can still be utilized. In addition, the DC drop of switches are eliminated when they are placed at the switching nodes.

Bidirectional electrostatic discharge (ESD) devices (see FIG. 10) may be provided for ESD protection and voltage reduction, in case the regulators are in different voltage domains. In these aspects of the present disclosure, a supplementary switch mode power supply (SMPS) may provide quiescent power to enable safe operation of the subsystem with collapsed power for a predefined configurable time interval until the automobile arrives in a safe location or a safe mode is entered, as defined by user or car-sensor status.

Figure 4:
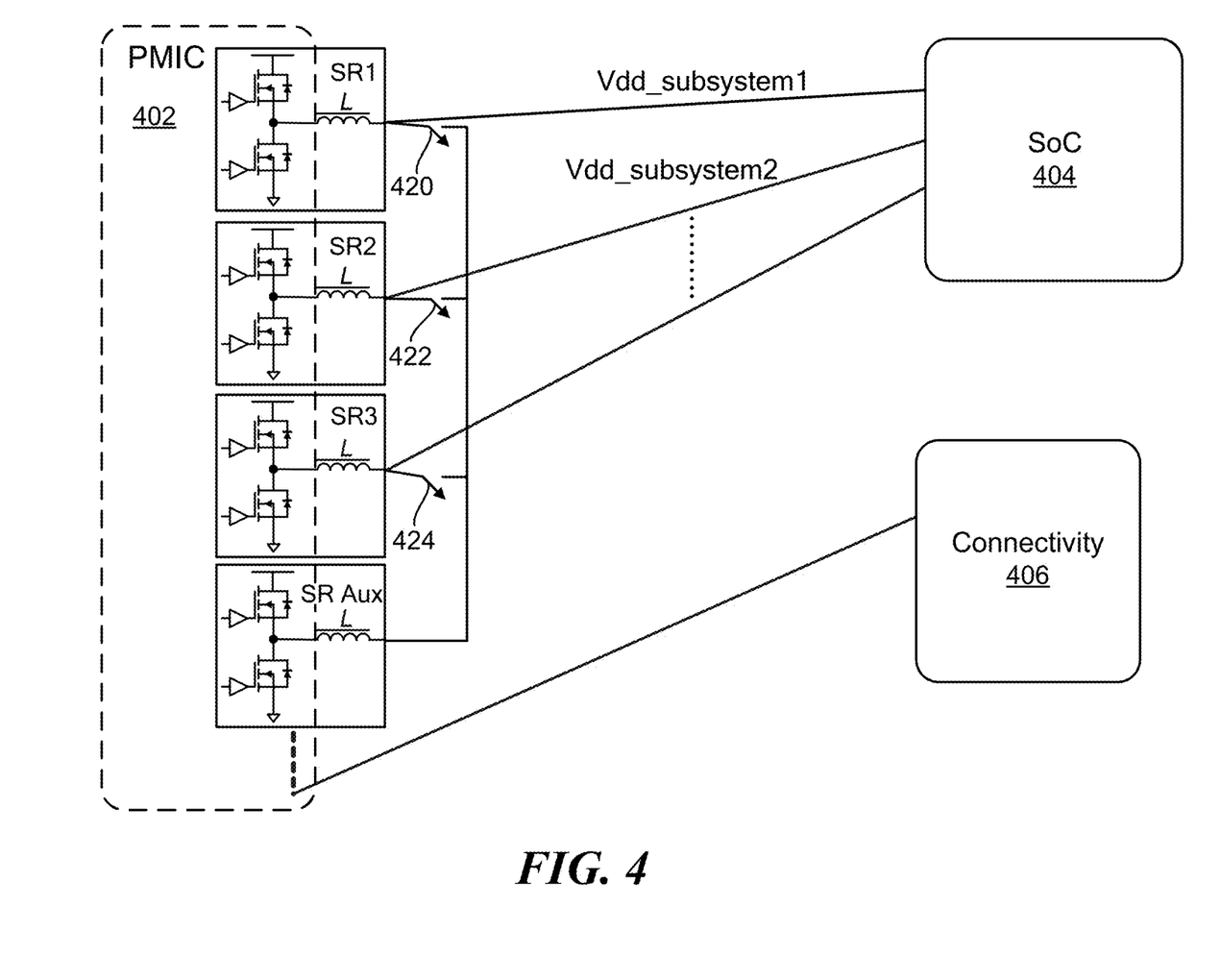
FIG. 4 is a diagram illustrating a supplemental recovery circuit with an auxiliary voltage regulator, in accordance with aspects of the present disclosure.

FIG. 4 is a diagram illustrating a supplemental recovery circuit with an auxiliary voltage regulator, in accordance with aspects of the present disclosure. In the example of FIG. 4, a replica or auxiliary voltage regulator is dedicated as a supplementary voltage regulator. The auxiliary voltage regulator does not supply power during normal operation. If a power collapse is detected, the auxiliary voltage regulator is engaged by closing the appropriate switch. Switch placement may be changed in these aspects. The auxiliary voltage regulator may provide necessary full power without any loading effects to other devices. In these aspects, the switches may be integrated into the PMIC or placed on a PMIC PCB.

In the example of FIG. 4, a PMIC 402 supplies power to an SoC 404 and a connectivity module 406. Although FIG. 4 shows four switching regulators (SR1 to SR AUX), any number of switching regulators and/or LDO type regulators are contemplated. A first switching regulator SR1 supplies voltage Vdd_subsystem1 to a first component or subsystem of the SoC 404. A second switching regulator SR2 supplies voltage Vdd_subsystem2 to a second component or subsystem of the SoC 404. At least one other voltage regulator (not shown) supplies voltage to the connectivity module 406. An auxiliary voltage regulator SR AUX does not normally supply power to any subsystem.

According to these aspects of the present disclosure, switches 420, 422, 424 are arranged in a parallel configuration between the voltage regulators SR1, SR2, SR3, SR AUX. In some aspects, the switches 420, 422, 424 are shunt switches. In the configuration shown in FIG. 4, a non-neighbor regulator (e.g., SR3) may supply power in case the first switching regulator SR1 loses power. That is, the non-neighbor regulator (e.g., SR3) may provide power instead of the auxiliary regulator SR AUX (not shown) or in addition to the auxiliary regulator SR AUX by closing a third switch 424 in addition to closing a first switch 420.

Figure 5:
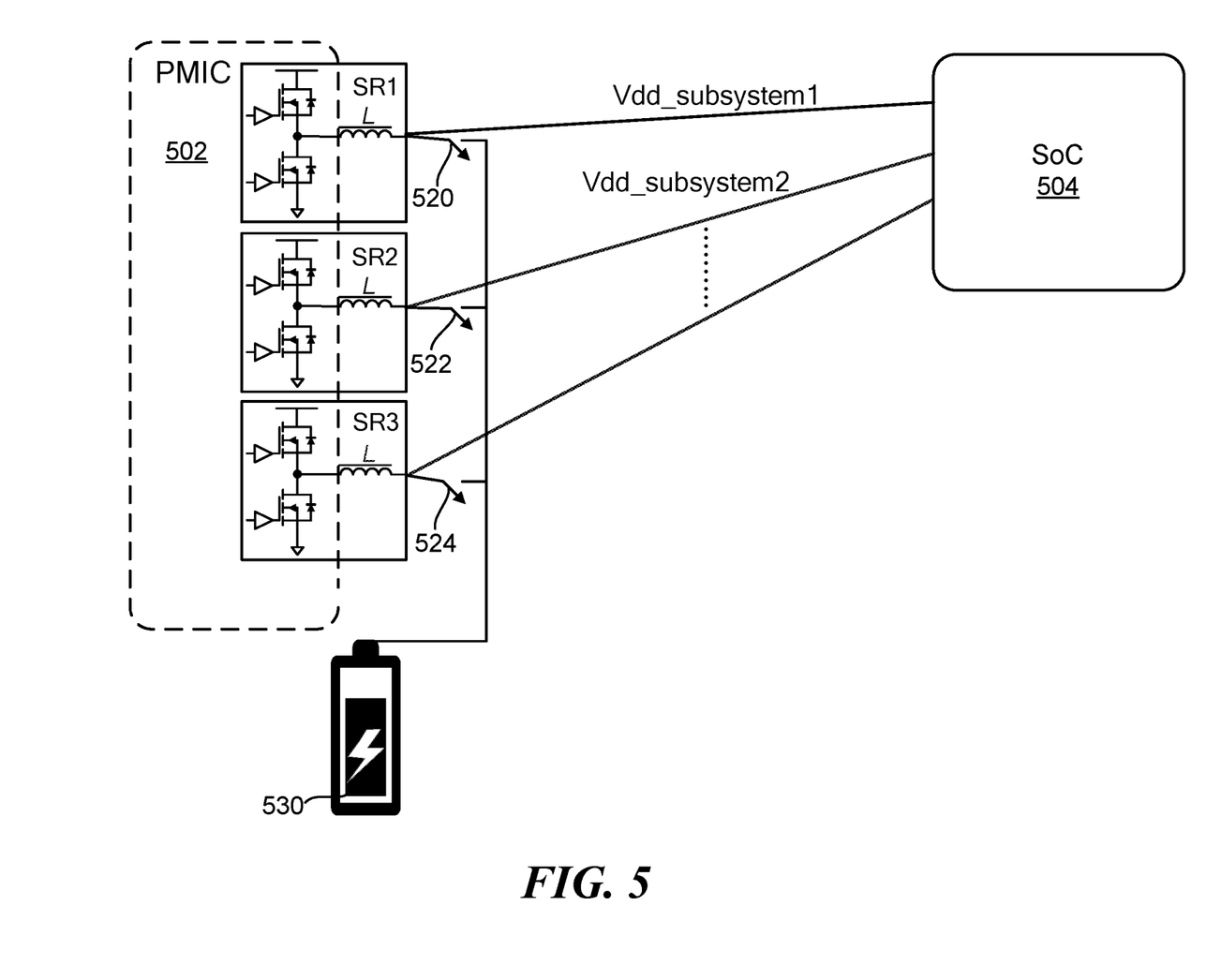
FIG. 5 is a diagram illustrating a supplemental recovery circuit including a battery, in accordance with aspects of the present disclosure.

FIG. 5 is a diagram illustrating a supplemental recovery circuit including a battery, in accordance with aspects of the present disclosure. The battery may help recover from a power collapse. A battery, however, is coarsely regulated. Thus, the battery may supply power in emergency situations because the voltage is not accurately regulated. In these aspects, a gate of each switch may be controlled by a voltage control circuit (see FIG. 9). The voltage control circuit intentionally drops the battery voltage to a lower supply voltage specified for the subsystem.

In the example of FIG. 5, a PMIC 502 supplies power to an SoC 504 (other chipsets not shown for ease of explanation). Although FIG. 5 shows three switching regulators (SR1 to SR3), any number of switching regulators and/or LDO regulators are contemplated. A first switching regulator SR1 supplies voltage Vdd_subsystem1 to a first component or subsystem of the SoC 504. A second switching regulator SR2 supplies voltage Vdd_subsystem2 to a second component or subsystem of the SoC 504. A battery 530 does not normally supply power directly to any subsystem.

According to these aspects of the present disclosure, switches 520, 522, 524 are arranged in a parallel configuration between the voltage regulators SR1, SR2, SR3. In some aspects, the switches 520, 522, 524 are shunt switches. In the configuration shown in FIG. 5, the battery 530 may supply power in case one of the switching regulators SR1, SR2, SR3 loses power and another switching regulator SR1, SR2, SR3 is unable to supplement the lost power. Gates of the switches 520, 522, 524 may be controlled by a voltage control circuit, as explained below with reference to FIG. 9.

Figure 6:
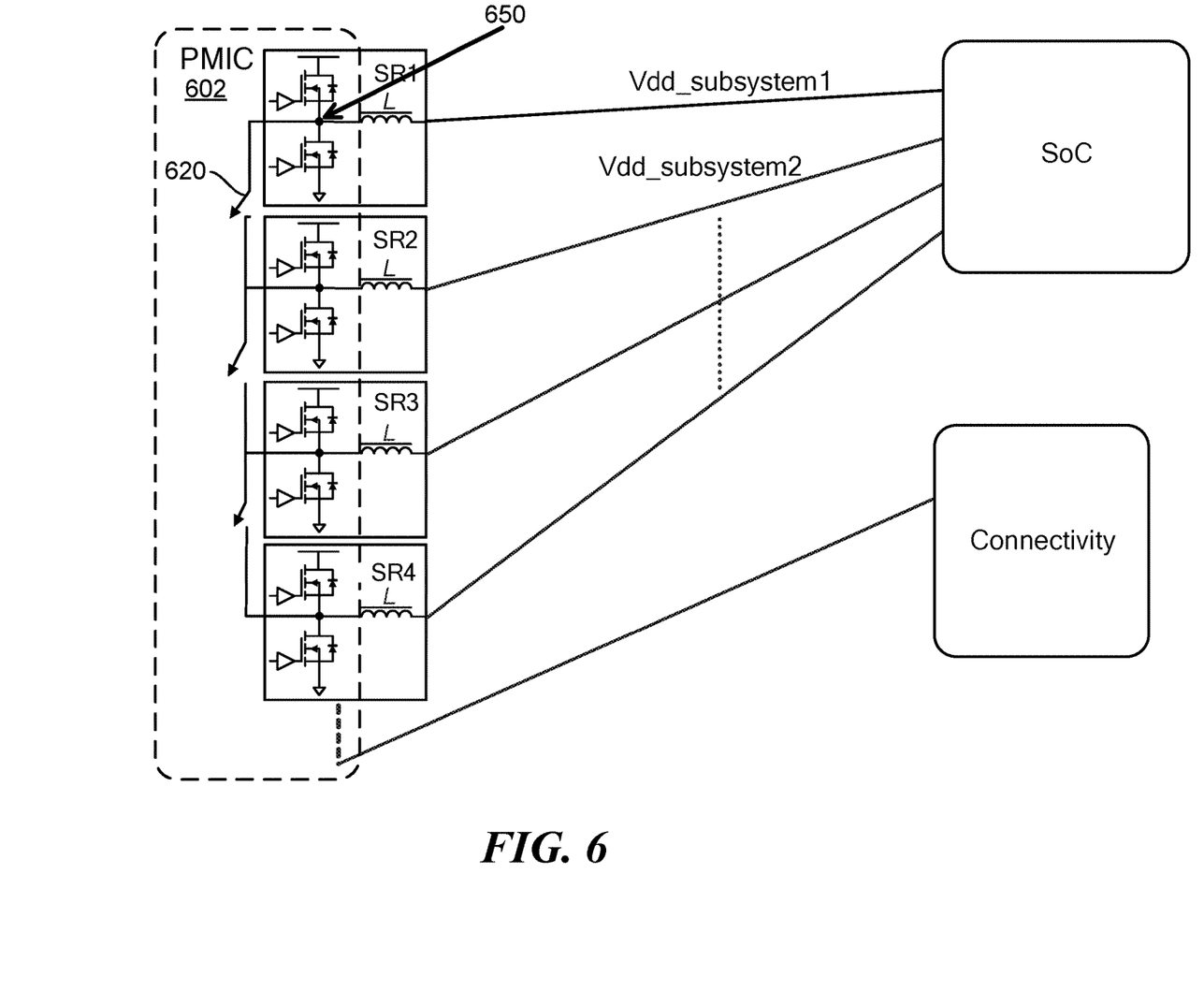
FIG. 6 is a diagram illustrating a supplemental recovery circuit with series switches coupled to a switch node, in accordance with aspects of the present disclosure.

FIG. 6 is a diagram illustrating a supplemental recovery circuit with series switches coupled to a switch node, in accordance with aspects of the present disclosure. In the example of FIG. 6, a PMIC 602 includes switches (only a first switch 620 is labelled to ease explanation). The switches are coupled to switch nodes of the switching regulators SR1, SR2, SR3, SR4. As seen in FIG. 6, the first switch 620 is on-chip and is coupled to a switch node 650 of the first switching regulator SR1. Although not shown in FIG. 6, the switches may be shunt switches, instead of a series switches. This configuration is particularly applicable to switching regulators.

Figure 7:
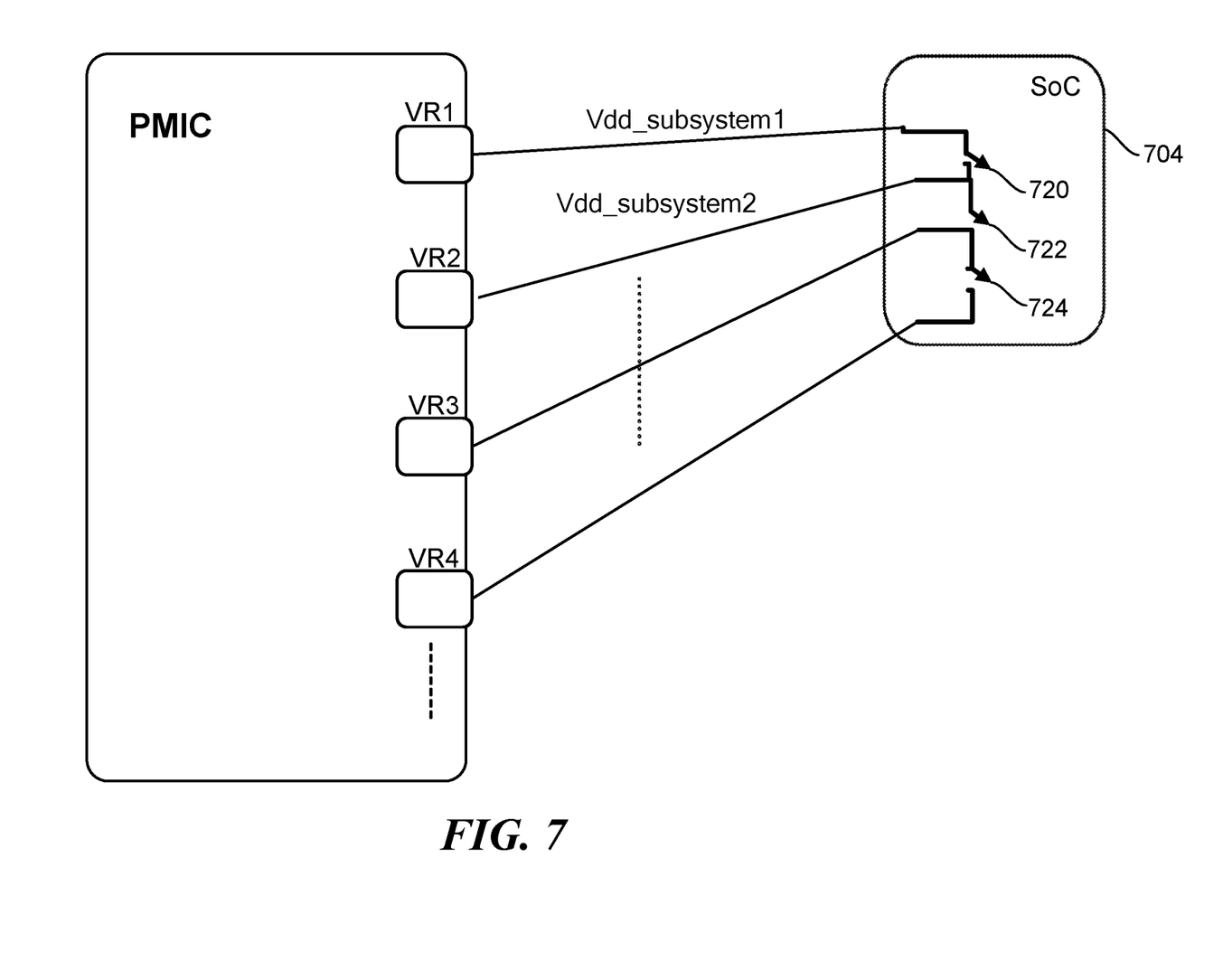
FIG. 7 is a diagram illustrating a supplemental recovery circuit with series switches at a chipset, in accordance with aspects of the present disclosure.

FIG. 7 is a diagram illustrating a supplemental recovery circuit with series switches at a chipset, in accordance with aspects of the present disclosure. In the implementation of FIG. 7, the chipset includes switches. For example, an SoC 704 may include switches 720, 722, 724 on-chip. The switches 720, 722, 724 may be in series, as seen in FIG. 7, or may be shunt switches. If multiple chipsets are present, the implementation of FIG. 7 may be desirable.

Figure 8:
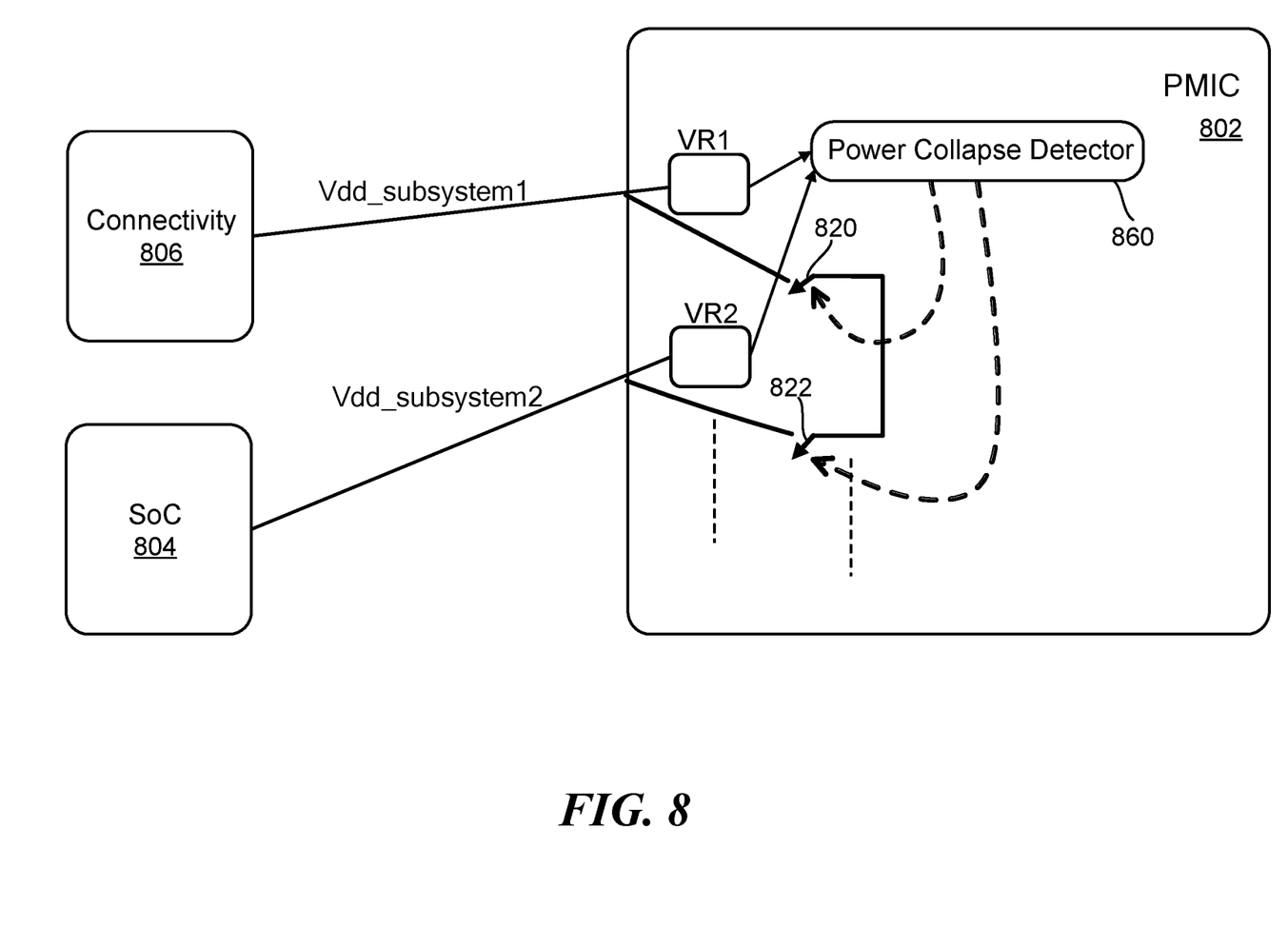
FIG. 8 is a diagram illustrating a supplemental recovery circuit with a power collapse detector, in accordance with aspects of the present disclosure.

FIG. 8 is a diagram illustrating a supplemental recovery circuit with a power collapse detector, in accordance with aspects of the present disclosure. In the example of FIG. 8, a PMIC 802 includes two voltage regulators VR1, VR2, each coupled to a different subsystem. A first voltage regulator VR1 supplies a first voltage Vdd_subsystem1 to a first subsystem in a connectivity module 806. A second voltage regulator VR2 supplies a second voltage Vdd_subsystem2 to a second subsystem in an SoC 804. A power collapse detector 860 senses voltage levels at the voltage regulators VR1, VR2. If the power collapse detector 860 detects loss of power at one of the voltage regulators VR1, VR2, the power collapse detector 860 closes the appropriate switches 820, 822. For example, if the power collapses at the first regulator VR1, the power collapse detector 860 close both switches 820, 822 to allow the second regulator VR2 to supplement the lost voltage to the first subsystem.

Figure 9:
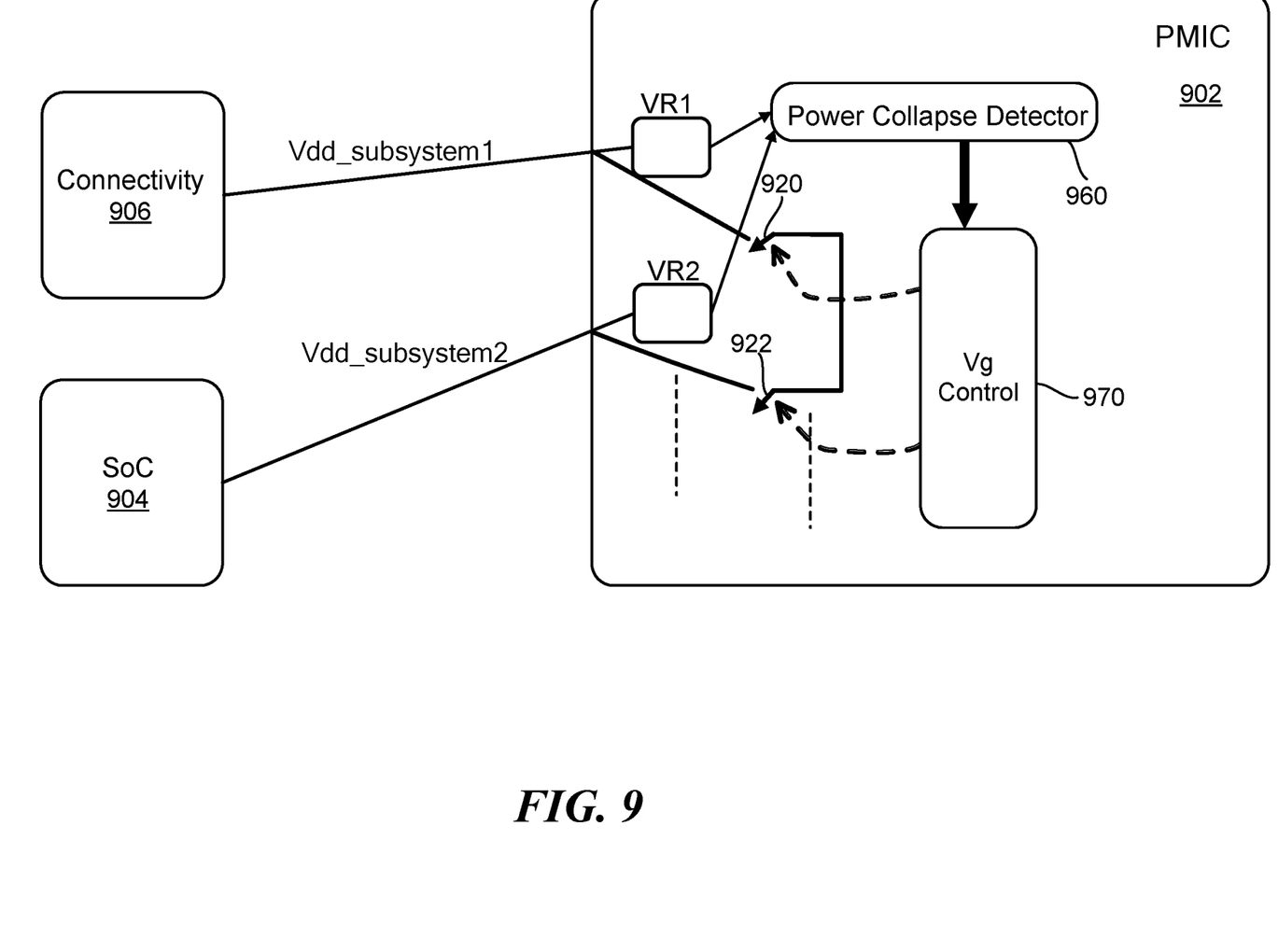
FIG. 9 is a diagram illustrating a supplemental recovery circuit with a variable gate voltage controller, in accordance with aspects of the present disclosure.

FIG. 9 is a diagram illustrating a supplemental recovery circuit with a variable gate voltage controller, in accordance with aspects of the present disclosure. In the example of FIG. 9, a PMIC 902 includes two voltage regulators VR1, VR2, each coupled to a different subsystem. A first voltage regulator VR1 supplies a first voltage Vdd_subsystem1 to a first subsystem in a connectivity module 906. A second voltage regulator VR2 supplies a second voltage Vdd_subsystem2 to a second subsystem in an SoC 904. A power collapse detector 960 senses voltage levels at the voltage regulators VR1, VR2. If the power collapse detector 960 detects loss of power at one of the voltage regulators VR1, VR2, the power collapse detector 960 closes the appropriate switches 920, 922. A variable gate voltage controller 970 controls the voltage supply if a supplemental voltage regulator operates at a different voltage level than a failing voltage controller. For example, if the first voltage regulator VR1 operates in a 2V power domain and the second voltage regulator VR2 operates in a 3V power domain, the variable gate voltage controller 970 may control the turn on resistance of a first switch 920, a second switch 922, or both switches 920, 922 when the second voltage regulator VR2 supplements the failed first voltage regulator VR1. As a result, the first subsystem will receive the proper voltage from the supplemental voltage regulator (the second voltage regulator VR2 in this example).

Figure 10:
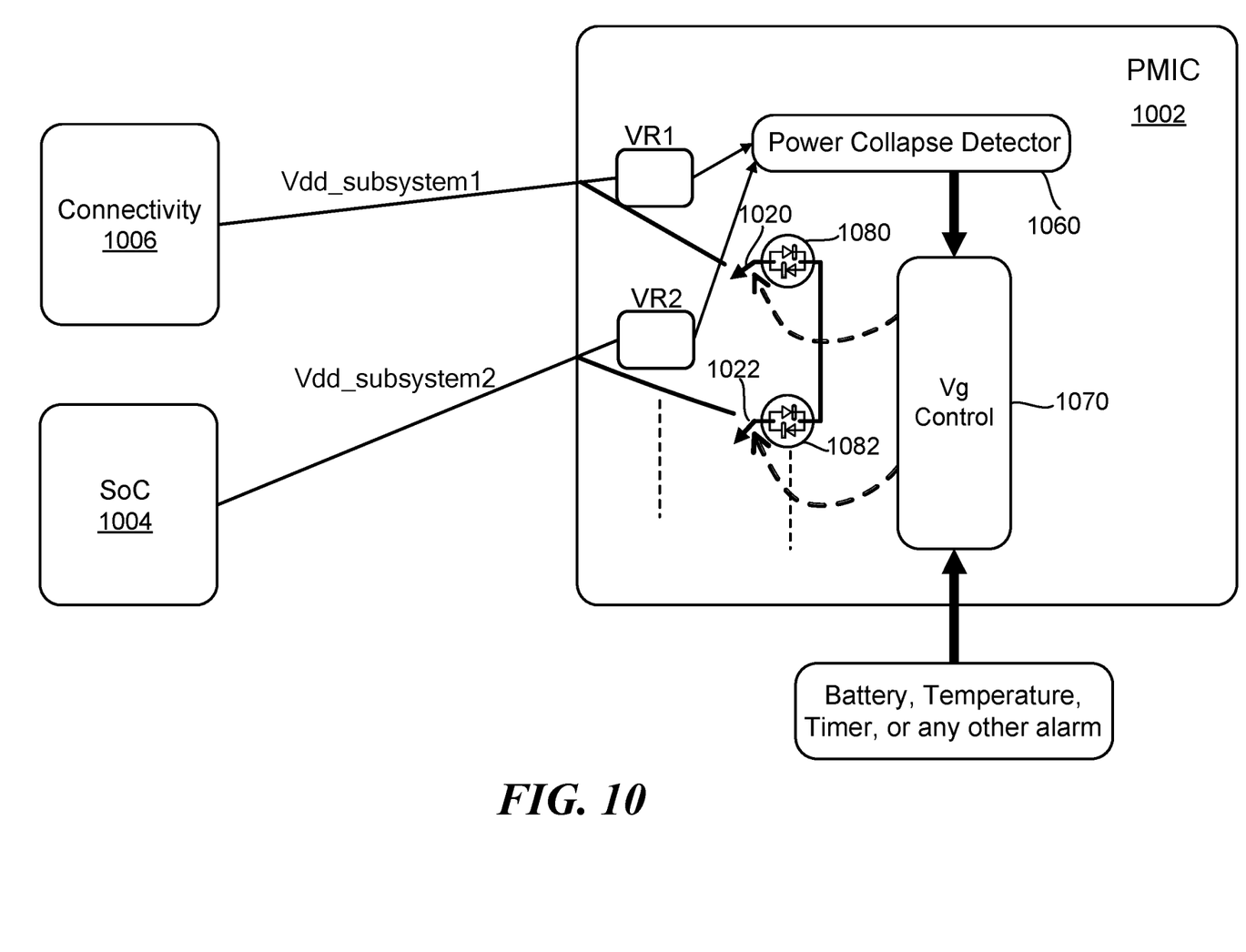
FIG. 10 is a diagram illustrating a supplemental recovery circuit with electrostatic discharge (ESD) devices, in accordance with aspects of the present disclosure.

FIG. 10 is a diagram illustrating a supplemental recovery circuit with electrostatic discharge (ESD) devices, in accordance with aspects of the present disclosure. In the example of FIG. 10, a PMIC 1002 includes two voltage regulators VR1, VR2, each coupled to a different subsystem. A first voltage regulator VR1 supplies a first voltage Vdd_subsystem1 to a first subsystem in a connectivity module 1006. A second voltage regulator VR2 supplies a second voltage Vdd_subsystem2 to a second subsystem in an SoC 1004. A power collapse detector 1060 senses voltage levels at the voltage regulators VR1, VR2 and closes the appropriate switches 1020, 1022, when a power collapse occurs. A variable gate voltage controller 1070 controls the voltage supply if a supplemental voltage regulator operates at a different voltage level than the failing voltage controller. ESD devices 1080, 1082 provide ESD protection for the various devices. The ESD devices 1080, 1082 also employ diodes to drop a voltage when a higher domain voltage regulator supplements a lower domain voltage regulator. The ESD devices may work in conjunction with the variable gate voltage controller 1070 to manage the voltage levels.

If a battery, temperature, timer, voltage, or any other state is abnormal, the variable gate voltage controller 1070 may shut down a voltage regulator that is sharing power or may change an on resistance of one of the switches 1020, 1022. For example, if the battery is draining too quickly when power is shared, or a temperature becomes too high, the variable gate voltage controller 1070 may act to address the issue, in response to receiving an alarm from one of the sensors.

As indicated above, FIGS. 2-10 are provided as examples. Other examples may differ from what is described with respect to FIGS. 2-10.

Figure 11:
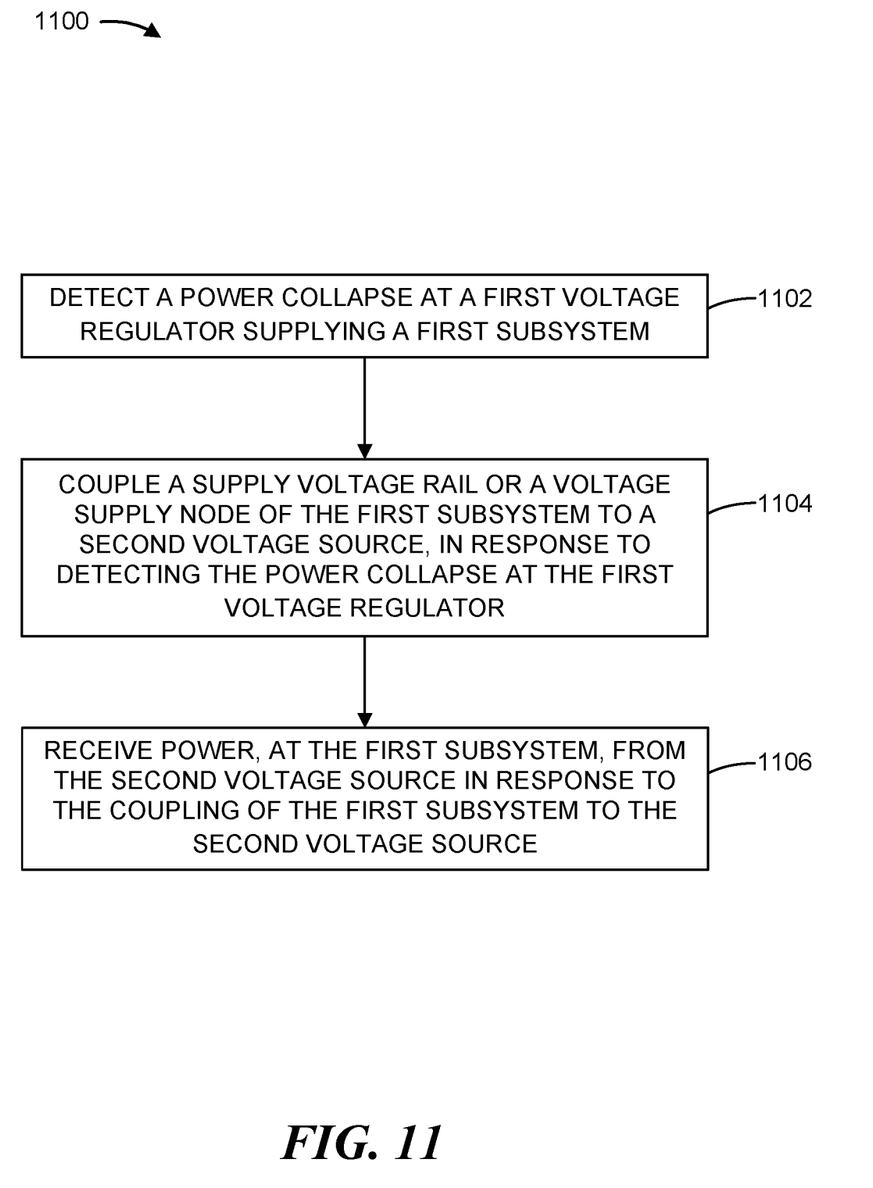
FIG. 11 is a flow diagram illustrating an example process performed, for example, by a power management system, in accordance with various aspects of the present disclosure.

FIG. 11 is a flow diagram illustrating an example process 1100 performed, for example, by a power management system, in accordance with various aspects of the present disclosure. The example process 1100 is an example of supplementary recovery for power failure on power management integrated circuit (PMIC) devices. As shown in FIG. 11, in some aspects, the process 1100 may include detecting a power collapse at a first voltage regulator supplying a first subsystem (block 1102). In some aspects, the process 1100 may also include coupling a supply voltage rail or a voltage supply node of the first subsystem to a second voltage source, in response to detecting the power collapse at the first voltage regulator (block 1104). For example, in some aspects, the second voltage source may be a second voltage regulator. In other aspects, the second voltage source may be a battery, and the method may further comprises regulating a voltage supply from the battery. In some aspects, the process 1100 may further include receiving power, at the first subsystem, from the second voltage source in response to the coupling of the first subsystem to the second voltage source (block 1106).

Example Aspects

Aspect 1: A method of recovering from a power failure, comprising: detecting a power collapse at a first voltage regulator supplying a first subsystem; coupling a supply voltage rail or a voltage supply node of the first subsystem to a second voltage source, in response to detecting the power collapse at the first voltage regulator; and receiving power, at the first subsystem, from the second voltage source in response to the coupling of the first subsystem to the second voltage source.

Aspect 2: The method of Aspect 1, in which the second voltage source is a second voltage regulator.

Aspect 3: The method of Aspect 1, in which the second voltage source is a battery, and the method further comprises regulating a voltage supply from the battery.

Aspect 4: The method of any of the preceding claims, further comprising coupling the first subsystem to a third voltage regulator, in response to detecting the power collapse at the first voltage regulator; and receiving power, at the first subsystem, from the third voltage regulator in response to the coupling of the first subsystem to the third voltage regulator.

Aspect 5: A power management integrated circuit (PMIC), comprising: a first voltage regulator coupled to a first subsystem; and a second power supply selectively coupled to the first subsystem via a first switch.

Aspect 6: The PMIC of Aspect 5, in which the second power supply comprises a second voltage regulator.

Aspect 7: The PMIC of Aspect 5 or 6, in which the second voltage regulator is an auxiliary voltage regulator.

Aspect 8: The PMIC of any of the Aspects 5-7, in which the second voltage regulator is coupled to a second subsystem.

Aspect 9: The PMIC of any of the Aspects 5-8, in which the first voltage regulator is selectively coupled to the second subsystem via a second switch.

Aspect 10: The PMIC of any of the Aspects 5-9, in which the first switch and the second switch are in series.

Aspect 11: The PMIC of any of the Aspects 5-9, in which the first switch and the second switch are in parallel.

Aspect 12: The PMIC of any of the Aspects 5-11, in which the first switch resides within the PMIC.

Aspect 13: The PMIC of any of the Aspects 5-12, further comprising a power collapse detector coupled to and configured to control the first switch.

Aspect 14: The PMIC of any of the Aspects 5-13, further comprising a voltage controller coupled to the first switch and configured to control a turn-on voltage of the first switch based on a difference between first voltage level of the first voltage regulator and a second voltage of the second power supply.

Aspect 15: The PMIC of any of the Aspects 5-14, in which the voltage controller is further configured to open the first switch in response to detecting a battery condition, a temperature level, or an alarm condition.

Aspect 16: The PMIC of any of the Aspects 5-15, further comprising an electrostatic discharge (ESD) protection circuit between the second power supply and the first subsystem.

Aspect 17: The PMIC of any of the Aspects 5-11 and 13-14, in which the first switch resides within the first subsystem.

Aspect 18: The PMIC of any of the Aspects 5 and 7-17, in which the second power supply comprises a battery.

Aspect 19: The PMIC of any of the Aspects 5-18, in which the first switch comprises a shunt switch.

Aspect 20: The PMIC of any of the Aspects 5-19, in which the first subsystem comprises one of a graphics processing unit (GPU), a central processing unit (CPU), a neural processing unit (NPU), or an automobile component.

Aspect 21: An apparatus for recovering from a power failure, comprising: means for detecting a power collapse at a first voltage regulator supplying a first subsystem; and means for coupling the first subsystem to a second voltage source, in response to detecting the power collapse at the first voltage regulator in order to provide power to the first subsystem from the second voltage source.

Aspect 22: The apparatus of Aspect 21, in which the second voltage source is a second voltage regulator.

Aspect 23: The apparatus of Aspect 21, in which the second voltage source is a battery, and the apparatus further comprises means for regulating a voltage supply from the battery.

Aspect 24: The apparatus of any of the Aspects 21-23, further comprising means for coupling the first subsystem to a third voltage regulator, in response to detecting the power collapse at the first voltage regulator in order to provide power to the first subsystem from the third voltage regulator.

Aspect 25: A system on chip (SoC) circuit, comprising: a first voltage regulator coupled to a first subsystem; and a second power supply selectively coupled to the first subsystem via a first switch.

Aspect 26: The SoC circuit of Aspect 25, in which the first voltage regulator resides in an auxiliary power management integrated circuit (PMIC).

Aspect 27: The SoC circuit of Aspect 25, in which the first voltage regulator resides in an on-chip power management integrated circuit (PMIC).

Aspect 28: The SoC circuit of Aspect 25, in which the first voltage regulator resides on-chip for the SoC.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. A method of recovering from a power failure, comprising:
    detecting a power collapse at a first voltage regulator of a power management integrated circuit (PMIC), the first voltage regulator supplying a first subsystem;
    coupling a supply voltage rail or a voltage supply node of the first subsystem to an auxiliary voltage regulator within the PMIC, in response to detecting the power collapse at the first voltage regulator, the auxiliary voltage regulator sourced with a same bandgap voltage reference, bandgap current reference, and clock circuit on the PMIC as the first voltage regulator, the auxiliary voltage regulator not supplying voltage to any subsystem before the coupling; and
    receiving power, at the first subsystem, from the auxiliary voltage regulator in response to the coupling of the first subsystem to the auxiliary voltage regulator via a closed switch associated with the first voltage regulator.

2. A power management integrated circuit (PMIC), comprising:
    a first voltage regulator coupled to a first subsystem;
    a first switch associated with the first voltage regulator; and
    an auxiliary voltage regulator selectively coupled to the first subsystem via the first switch, when closed, the auxiliary voltage regulator not supplying voltage to any subsystem before coupling to the first subsystem in response to a power collapse of the first voltage regulator, the auxiliary voltage regulator sourced with a same bandgap voltage reference, bandgap current reference, and clock circuit on the PMIC as the first voltage regulator.

3. The PMIC of claim 2, further comprising a second voltage regulator coupled to a second subsystem.

4. The PMIC of claim 3, in which the first voltage regulator is selectively coupled to the second subsystem via a second switch.

5. The PMIC of claim 4, in which the first switch and the second switch are in series.

6. The PMIC of claim 4, in which the first switch and the second switch are in parallel.

7. The PMIC of claim 2, in which the first switch resides within the PMIC.

8. The PMIC of claim 7, further comprising a power collapse detector coupled to and configured to control the first switch.

9. The PMIC of claim 7, further comprising a voltage controller coupled to the first switch and configured to control a turn-on voltage of the first switch based on a difference between first voltage level of the first voltage regulator and a second voltage of the auxiliary voltage regulator.

10. The PMIC of claim 9, in which the voltage controller is further configured to open the first switch in response to detecting a battery condition, a temperature level, or an alarm condition.

11. The PMIC of claim 7, further comprising an electrostatic discharge (ESD) protection circuit between the auxiliary voltage regulator and the first subsystem.

12. The PMIC of claim 2, in which the first switch resides within the first subsystem.

13. The PMIC of claim 2, in which the auxiliary voltage regulator comprises a battery.

14. The PMIC of claim 2, in which the first switch comprises a shunt switch.

15. The PMIC of claim 2, in which the first subsystem comprises one of a graphics processing unit (GPU), a central processing unit (CPU), a neural processing unit (NPU), or an automobile component.

16. An apparatus for recovering from a power failure, comprising:

means for detecting a power collapse at a first voltage regulator of a power management integrated circuit (PMIC), the first voltage regulator supplying a first subsystem; and means for coupling the first subsystem to an auxiliary voltage regulator within the PMIC via a closed switch associated with the first voltage regulator, the coupling occurring in response to detecting the power collapse at the first voltage regulator in order to provide power to the first subsystem from the auxiliary voltage regulator, the auxiliary voltage regulator sourced with a same bandgap voltage reference, bandgap current reference, and clock circuit on the PMIC as the first voltage regulator, the auxiliary voltage regulator not supplying voltage to any subsystem before the coupling.

17. The apparatus of claim 16, further comprising means for coupling the first subsystem to a third voltage regulator, in response to detecting the power collapse at the first voltage regulator in order to provide power to the first subsystem from the third voltage regulator.

18. A system on chip (SoC) circuit, comprising:

a first voltage regulator coupled to a first subsystem, the first voltage regulator residing in an auxiliary power management integrated circuit (PMIC), an on-chip PMIC, or on-chip for the SoC; and an auxiliary voltage regulator selectively coupled to the first subsystem via a first switch when closed, the auxiliary voltage regulator not supplying voltage to any subsystem before coupling to the first subsystem in response to a power collapse of the first voltage regulator, the auxiliary voltage regulator residing in the auxiliary power management integrated circuit (PMIC), the on-chip PMIC, or on-chip for the SoC, the auxiliary voltage regulator sourced with a same bandgap voltage reference, bandgap current reference, and clock circuit on the PMIC as the first voltage regulator.

* * * * *